United States Patent
Coronado et al.

(10) Patent No.: US 8,930,904 B2
(45) Date of Patent: *Jan. 6, 2015

(54) VERIFICATION OF HARDWARE CONFIGURATION

(71) Applicant: International Business Machines Corporation, Armonk, NY (US)

(72) Inventors: Juan A. Coronado, Tucson, AZ (US); Roger G. Hathorn, Tucson, AZ (US); Dinh H. Le, Tucson, AZ (US); Daniel J. Perkin, Tucson, AZ (US); Adelaide M. Richards, Tucson, AZ (US); Aaron E. Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 112 days.

This patent is subject to a terminal disclaimer.

(21) Appl. No.: 13/623,523

(22) Filed: Sep. 20, 2012

(65) Prior Publication Data

US 2013/0024586 A1     Jan. 24, 2013

Related U.S. Application Data

(63) Continuation of application No. 12/018,668, filed on Jan. 23, 2008, now Pat. No. 8,327,331.

(51) Int. Cl.
| | | |
|---|---|---|
| *G06F 9/44* | (2006.01) | |
| *G06F 13/00* | (2006.01) | |
| *G06F 12/00* | (2006.01) | |
| *G06F 15/173* | (2006.01) | |
| *G06F 11/22* | (2006.01) | |

(52) U.S. Cl.
CPC ................. *G06F 11/2247* (2013.01)
USPC ........... 717/121; 717/126; 717/127; 709/223; 710/104; 711/210

(58) Field of Classification Search
None
See application file for complete search history.

(56) References Cited

U.S. PATENT DOCUMENTS

| | | |
|---|---|---|
| 5,170,472 A | 12/1992 | Cwiakala et al. |
| 5,257,368 A | 10/1993 | Benson et al. |
| 5,414,851 A | 5/1995 | Brice, Jr. et al. |
| 5,712,974 A | 1/1998 | Gainey et al. |

(Continued)

OTHER PUBLICATIONS

Input/Output Configuration Program User's Guide for IYP IOCP: SB10-7029-02a, IBM, May 2002, 366 pages, [retrieved on Sep. 28, 2011], Retrieved from the Internet: <URL:http://www-01.ibm.com/support/docview.wss?uid=isg2da8e0fc42f82c05785256b1800472e85&aid=1>.*

(Continued)

*Primary Examiner* — Thuy Dao
*Assistant Examiner* — Geoffrey St Leger
(74) *Attorney, Agent, or Firm* — Griffiths & Seaton PLLC (57) ABSTRACT

A method for verifying an input/output (I/O) hardware configuration is provided. Data from an input/output data set (IOCDS) is extracted for building a verification command. The IOCDS contains hardware requirements that define at least software devices associated with a logical control unit (LCU). The verification command is processed. The verification command includes a software device address range associated with a logical control unit (LCU) of the I/O hardware. The LCU utilizes a first logical path. The software device address range utilizing the first logical path is compared with an existing software device address range utilizing at least one additional logical path. The verification command is accepted if the software device address range and the existing software device address range match.

18 Claims, 7 Drawing Sheets

(56) References Cited

U.S. PATENT DOCUMENTS

| | | | |
|---|---|---|---|
| 6,094,713 A * | 7/2000 | Khadder et al. | 711/210 |
| 6,564,369 B1 * | 5/2003 | Hove et al. | 717/121 |
| 7,127,599 B2 | 10/2006 | Brice, Jr. et al. | |
| 7,149,821 B2 | 12/2006 | Brice, Jr. et al. | |
| 7,793,145 B2 * | 9/2010 | Kalwitz | 714/6.12 |
| 7,934,198 B2 * | 4/2011 | Gruner et al. | 717/121 |
| 7,954,090 B1 * | 5/2011 | Qureshi et al. | 717/127 |
| 2003/0177335 A1 * | 9/2003 | Luick | 711/210 |
| 2004/0006612 A1 * | 1/2004 | Jibbe et al. | 709/223 |
| 2006/0161895 A1 * | 7/2006 | Speeter et al. | 717/121 |
| 2007/0044077 A1 * | 2/2007 | Srivastava et al. | 717/126 |
| 2008/0052433 A1 * | 2/2008 | Harima et al. | 710/104 |
| 2008/0109584 A1 * | 5/2008 | Kalwitz | 710/104 |

OTHER PUBLICATIONS

Getting Started—A User Guide to Obtain—HCD Import, Knowledge Flow Corp., 2004, 36 pages, [retrieved on Jul. 9, 2012], Retrieved from the Internet: <URL:http://web.archive.org/web/20040321075340/http://www.obtain.com/PDF%20Files/HCD%20Import.PDF>.*

R. Cwiakala et al., "MVS Dynamic Reconfiguration Management," IBM J. Res. Develop. vol. 36 No. 4, Jul. 1992, pp. 633-646.

* cited by examiner

VERIFICATION OF HARDWARE CONFIGURATION

CROSS-REFERENCE TO RELATED APPLICATION

This application is a continuation application of copending U.S. application Ser. No. 12/018,668, filed Jan. 23, 2008, now U.S. Published Application US 2009/018789-A1 published on Jul. 23, 2009, the entire contents of which are incorporated herein by reference and relied upon for claiming the benefit of priority.

BACKGROUND OF THE INVENTION

1. Field of the Invention

The present invention relates in general to computers, and more particularly to a method, system, and computer program product for verifying a hardware configuration in a computer system.

2. Description of the Related Art

Computer systems may include a host which is connected to a computer subsystem, such as a computer storage subsystem. Computer systems may use an operating system such as an S/390 system offered by International Business Machines Corporation, Armonk, N.Y. to facilitate data transfer between such a computer storage subsystem and the host. Such operating systems require a preliminary configuration of input/output (I/O) hardware prior to the execution of related applications by the host.

The configuration of such I/O hardware may be generally performed by hardware configuration software, firmware, or hardware. Typically, however, this preliminary hardware configuration may be implemented by the host without regard to existing and/or established configurations recognized by I/O subsystem components such as a storage subsystem controller responsible for a plurality of connected I/O devices such as storage devices. As a result, related I/O hardware may receive an invalid configuration which may go undetected. This scenario may lead to two different software applications unintentionally accessing the same I/O device, for example.

SUMMARY OF THE INVENTION

A need exists for a system, method, and computer program product for verifying a hardware configuration in computer systems. Accordingly, in one embodiment, by way of example only, a method for verifying an input/output (I/O) hardware configuration is provided. Data from an input/output data set (IOCDS) is extracted for building a verification command. The IOCDS contains hardware requirements that define at least software devices associated with a logical control unit (LCU). The verification command is processed. The verification command includes a software device address range associated with a logical control unit (LCU) of the I/O hardware. The LCU utilizes a first logical path. The software device address range utilizing the first logical path is compared with an existing software device address range utilizing at least one additional logical path. The verification command is accepted if the software device address range and the existing software device address range match.

In another embodiment, again by way of example only, a system for verifying an input/output (I/O) hardware configuration is provided. A controller is coupled to a logical control unit (LCU) of the I/O hardware. The controller extracts data from an input/output data set (IOCDS) for building a verification command. The IOCDS contains hardware requirements that define at least software devices associated with a logical control unit (LCU). The verification command is processed. The verification command includes a software device address range associated with a logical control unit (LCU) of the I/O hardware. The LCU utilizes a first logical path. The software device address range utilizing the first logical path is compared with an existing software device address range utilizing at least one additional logical path. The verification command is accepted if the software device address range and the existing software device address range match.

In still another embodiment, again by way of example only, a computer program product is provided for verifying an input/output (I/O) hardware configuration. The computer program product comprising a computer-readable storage medium having computer-readable program code portions stored therein. The computer-readable program code portions include a first executable portion that extracts data from an input/output data set (IOCDS) for building a verification command. The IOCDS contains hardware requirements that define at least software devices associated with a logical control unit (LCU). The verification command is processed. The verification command includes a software device address range associated with a logical control unit (LCU) of the I/O hardware. The LCU utilizes a first logical path. The software device address range utilizing the first logical path is compared with an existing software device address range utilizing at least one additional logical path. The verification command is accepted if the software device address range and the existing software device address range match.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

FIG. 1 depicts an exemplary computing environment 100. Environment 100 includes a controller 110 in combination with a plurality of information storage and retrieval systems. For example, environment 100 includes controller 110 in combination with information storage and retrieval systems 120, 130, 140, and additional systems not shown.

Figure 1A:
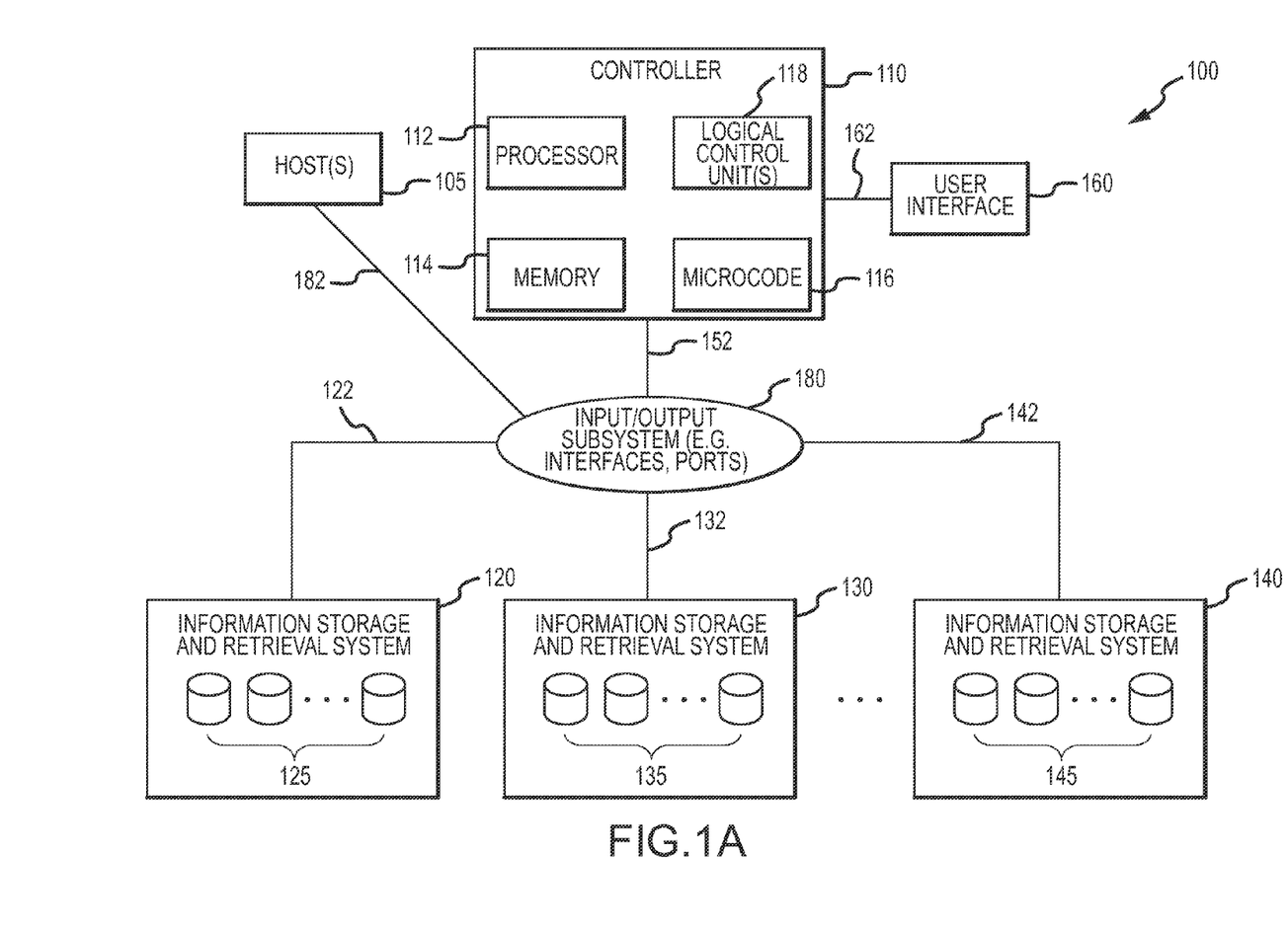
FIG. 1a depicts one embodiment of a computing environment to incorporate and use one or more aspects of the claimed subject matter.

In certain embodiments, environment 100 further includes an input/output or "channel" subsystem 180. Subsystem 180 may include network interfaces, for example, a Storage Attached Network ("SAN"), a local area network (LAN), a wide area network (WAN), a private network or combinations thereof. In these embodiments, controller 110 is capable of communicating with subsystem 180 via communication link 152.

Subsystem 180 may also include other interface devices as will be further described. Subsystem 180 may include such devices as host adapters. Subsystem 180 may include components or devices, such as a host adapter device having ports. The address of these ports may be used to define a "logical path" as will be further described.

Controller 110 includes processor 112, memory 114, and microcode 116. In certain embodiments, memory 114 comprises non-volatile memory, such as for example, one or more EEPROMs (Electrically Erasable Programmable Read Only Memory), one or more flash PROMs (Programmable Read Only Memory), battery backup RAM, hard disk drive, combinations thereof, and the like. Controller 110 additionally includes logical control unit(s) 118. Logical control units 118 are assigned and responsible a certain number of I/O devices 125, 135, and so on.

User interface 160 communicates with controller 110 via communication link 162. In certain embodiments, communication link 162 may be implemented as subsystem 180. In certain embodiments controller 110 may include user interface 160. Host computer 105 is capable of communication with any of the components of environment 100 using subsystem 180 via communication link 182. In other embodiments, host computer 105 may communicate with any of the components of data processing system 100 directly using for example, a host adapter as part of subsystem 180. Controller 110 is shown external to each of the information storage and retrieval systems comprising system 100. In other embodiments, however, controller 110 may be integral with one or more of the information storage and retrieval systems comprising environment 100.

Controller 110 is capable of bidirectional communication with information storage and retrieval systems 120, 130, and 140, using subsystem 180, communication link 152 and communication links 122, 132, and 142, respectively. Controller 110 communicates with a plurality of information storage and retrieval systems using interfaces of subsystem 180, such as for example, a SAN. In other embodiments, controller 110 may also communicate directly with any of the information storage and retrieval systems. In yet other embodiments, controller 110 communicates directly with one or more information storage and retrieval systems, and with one or other information storage and retrieval systems using subsystem 180. In the depicted embodiment, because controller 110 is responsible for storage devices in subsystems 120, 130, and 140, etc., controller 110 may be also referred to as a storage controller 110.

Communication links 122, 132, 142, 152, 162 and 182, may be independently selected from the group comprising a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Information storage and retrieval system 120 includes a plurality of information storage media as I/O devices 125. In certain embodiments, a plurality of I/O devices 125 comprise one or more hard disk drives, one or more tape storage media, one or more optical storage media, one or more electronic storage media and combinations thereof. Similarly, systems 130 and 140 are organized in a similar manner including I/O devices 135 and 145, respectively.

As those skilled in the art will appreciate, information and retrieval storage systems 120, 130, and 140, may comprise elements in addition to the plurality of storage media shown. As those skilled in the art will further appreciate, such information storage and retrieval systems may further include, without limitation, one or more processors, one or more data buffers, one or more DASD devices, one or more data caches, one or more input/output adapters, one or more storage device adapters, one or more operator input panels, one or more web servers, one or more robotic accessors, one or more data storage devices which include the plurality of storage media 125 and the like.

I/O or channel subsystem 180 directs the flow of information between the host and I/O devices 125, 135, and 145 in systems 120, 130, and 140. Subsystem 180 relieves the central processors of the task of communicating directly with the input/output devices and permits data processing to proceed concurrently with input/output processing. To provide communications, the subsystem employs I/O communications adapters such as host adapters previously described. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can incorporate and use one or more aspects of the present invention.

Channel subsystem uses one or more input/output paths as communication links in managing the flow of information to or from input/output devices 125, 135, and 145. In this particular example, these paths are called channel paths, since the communications adapters are channels. Each channel path 170 (FIG. 1b) includes a channel 172 of channel subsystem 180, a logical control unit 118, a link (e.g., serial or parallel) between the channel and control unit, and one or more I/O devices (e.g., 125) coupled to the control unit. In other embodiments, channel paths may have multiple control units and/or other components. Further, in another example, it is also possible to have one or more dynamic switches as part of the channel path. A dynamic switch is coupled to a channel and a control unit and provides the capability of physically interconnecting any two links that are attached to the switch. Further details regarding channel subsystems are described in Casper et al., U.S. Pat. No. 5,526,484, entitled "Method And System For Pipelining The Processing Of Channel Command Words," issued on Jun. 11, 1996, which is hereby incorporated herein by reference in its entirety.

Figure 1B:
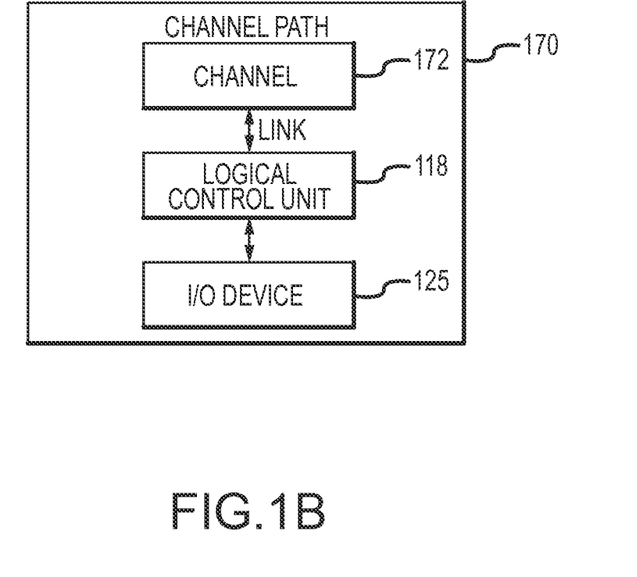
FIG. 1b depicts one example of an I/O path (e.g., a channel path portion of a logical path) used for communications in the computing environment of FIG. 1a, in accordance with an aspect of the claimed subject matter.

A logical control unit may be accessible by the channel subsystem by more than one channel path. Similarly, an I/O device may be accessible by the channel subsystem through more than one control unit, each having one or more channel paths to the channel subsystem. The control unit accepts control signals from the channel subsystem, controls the timing of data transfer over the channel path, and provides indications concerning the status of the device. The control unit may be housed separately or it may be physically and logically integrated with the I/O device, the channel subsystem, or a central processor.

The I/O device attached to the control unit may be designed to perform certain limited operations, or it may perform many different operations. To accomplish its operations, the device uses detailed signal sequences peculiar to its type of device. The control unit decodes the commands received from the channel subsystem, interprets them for the particular type of device, and provides the signal sequence required for the performance of the operation.

In addition to one or more channels, a channel subsystem includes one or more subchannels. Each subchannel is provided for and dedicated to an I/O device, or group of I/O devices, coupled to the program through the channel subsystem. Each subchannel provides information concerning the associated I/O device, or group of I/O devices, and its attachment to the channel subsystem. The subchannel also provides information concerning I/O operations and functions involving the associated I/O device, or group of I/O devices. The subchannel provides a logical appearance of a device or group of devices to the program and is the means by which the channel subsystem provides information about associated I/O devices to the central processors, which obtain this information by executing I/O instructions. The subchannel has internal storage that includes information in the form of a channel command word (CCW) address, a channel path identifier, device number, count, status indication and I/O interruption subclass code, as well as information on path availability and functions pending or being performed. I/O operations are initiated with a device by the execution of I/O instructions that designate the subchannel associated with the device or devices.

Figure 1C:
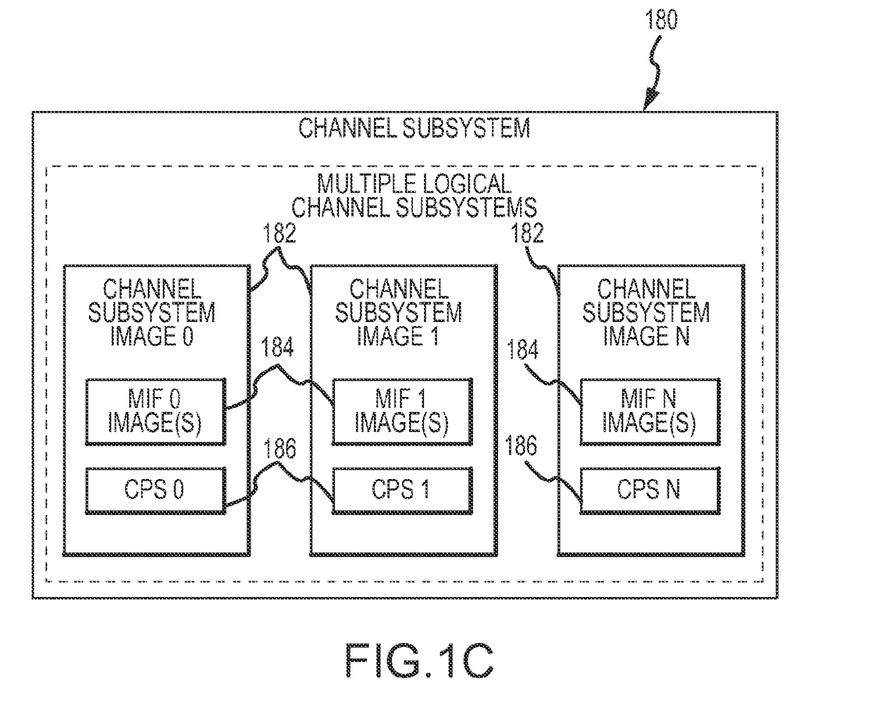
FIG. 1c depicts one embodiment of an example of an I/O subsystem (e.g., a channel subsystem) of FIG. 1a being configured as a plurality of I/O subsystem (e.g., channel subsystem) images, in accordance with an aspect of the claimed subject matter.

Further details regarding a channel subsystem are described with reference to FIG. 1c. In accordance with an aspect of the present invention, channel subsystem 180 (or other 180 subsystem) is configured as a plurality of channel subsystem images 182 (or other I/O subsystem images), each identified by a channel subsystem image identifier (CSSID) (or other I/O subsystem identifier). In one example, the channel subsystem is configured, either by model dependent means, in which configuration controls are used during initialization, or by use of appropriate dynamic I/O configuration commands, as one to 256 channel subsystem images, as described in further detail below. Each channel subsystem image appears to a program as a complete channel subsystem. Each channel subsystem image may have from 1 to 256 unique channel paths, thereby increasing the maximum number of channel paths that may be configured to the channel subsystem from 256 to 65,536.

A channel subsystem image 182 includes, for instance, a multiple image facility (MIF) 184, which includes one or more (e.g., up to 16) MIF images, each identified by a MIF image identifier (IID). The multiple image facility allows each logical partition to achieve independent access to the channel paths, logical control units and I/O devices that are configured to and dynamically shared by multiple logical partitions.

As one example, each logical partition is configured to a different MIF image 184 in order to provide the logical partition with an independent set of controls for channel paths, control units and devices that are shared by other logical partitions. Various details regarding the multiple image facility are described in Brice, Jr. et al., U.S. Pat. No. 5,414,851, entitled "Method And Means For Sharing I/O Resources By A Plurality Of Operating Systems," issued on May 9, 1995, which is hereby incorporated herein by reference in its entirety.

Figure 1D:
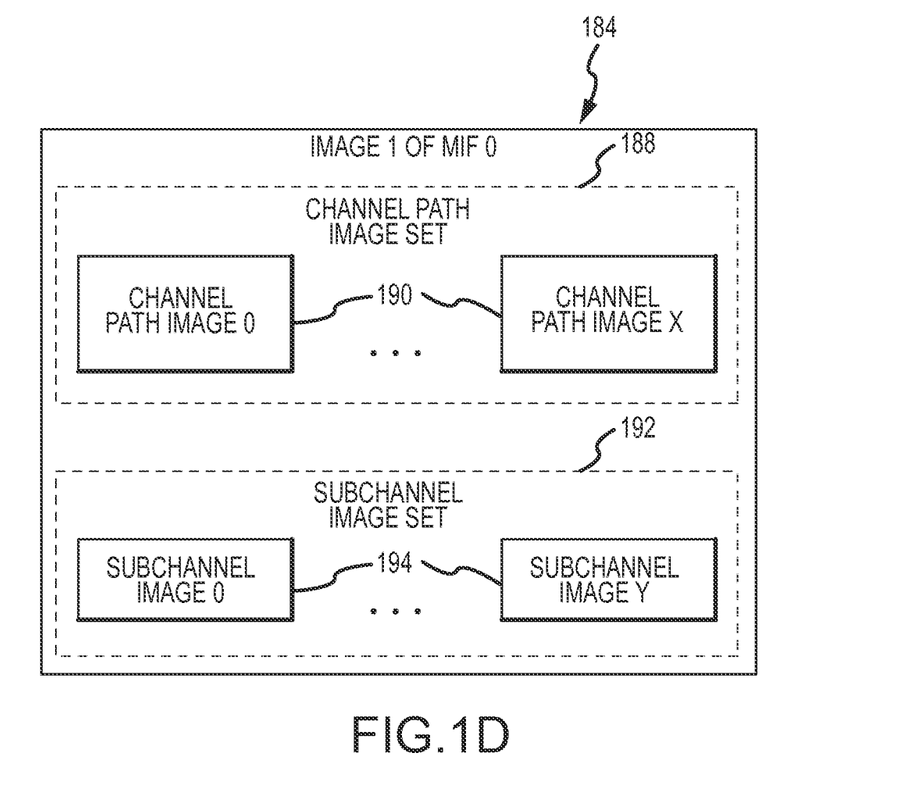
FIG. 1d depicts further details of a multiple image facility (MIF) image of a channel subsystem image of FIG. 1c, in accordance with an aspect of the claimed subject matter.

As shown in FIG. 1d, for each MIF image, a separate set of channel path controls and a separate set of subchannel controls are provided by the channel subsystem. For each MIF image, each set of channel path controls for each configured channel path is called a channel path image 184. The collection of one or more channel path images associated with the channel paths that are configured to a MIF image is called a channel path image set 188.

Further, for each MIF image, a separate subchannel, called a subchannel image 194, is provided for each I/O device or group of devices that is configured to the MIF image. A collection of one or more subchannel images that are configured to a MIF image is called a subchannel image set 192.

Figure 1E:
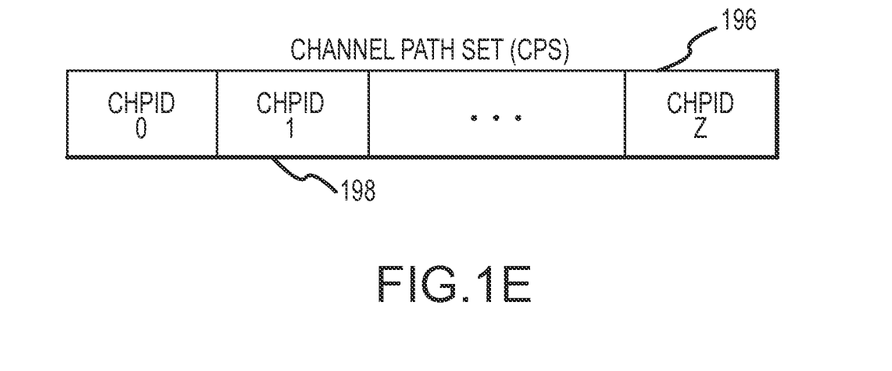
FIG. 1e depicts further details of a channel path set (CPS) of a channel subsystem image of FIG. 1c, in accordance with an aspect of the claimed subject matter.

Referring back to FIG. 1c, in addition to a MIF, a channel subsystem image 182 also includes a channel path set (CPS) 186. Channel path set 186 includes, for instance, one to 256 channel paths (FIG. 1e) configured to one or more channel path images in the associated MIF. Each channel path is identified by a channel path identifier (CHPID) (e.g., CHPIDs 196 and 198). Each channel path configured to a channel path set may be unique from other channel paths configured to other provided channel subsystem images. However, because as many as 256 channel subsystem images may be provided, the CHPID values assigned to channel paths in each of the channel path sets may not be unique. Therefore, each channel path is specified by a unique address formed by, for instance, a concatenation of CSSID with the channel path identifier assigned to the channel path. The image ID (IID) further identifies a channel path image for each configured channel path.

In the aforementioned S/390 operating system, an administrator must initially configure an Input/Output Configuration Data Set (IOCDS) before users can run applications against the controller. IOCDS is a collection of hardware requirements that define (1) the hardware configuration required for communications between the host and the controller, and (2) the controller hardware resources the host is allowed to access for I/O purposes. IOCDS contains the following hardware definitions needed for communications between the host and the controller: (1) Channel Path Identifiers (CHPIDs), (2) Channel information, such as channel type, and (3) Switch information, such as switch type, and outbound ports from the switch if the host connection to the controller is through a switch.

For I/O from a host to a storage controller, IOCDS contains the following hardware definitions: (1) the storage controller LCUs, (2) the number of devices associated with each LCU, (3) device characteristics such as whether an I/O device is a "base" or "alias" device, whether the device is off-line or online at initial program load (IPL), etc., (4) the number of I/O devices defined as base devices, (5) the number of I/O devices defined as alias devices, (6) the number of alias devices per base device, and (7) software device address ranges the host will use to address the devices in the storage controller.

The usage of the IOCDS hardware configuration comes into play once the host starts its IPL process. The host uses the IOCDS hardware definition to establish "logical paths" for each LCU defined in IOCDS between the host and the storage controller. These logical paths will be further described. The host also does device verification for each base device defined in IOCDS. When the devices are vary-on after IPL completes, the host performs the grouping of all the logical paths per each LCU. In the same process, the host performs the binding of the alias devices to their base device. For any discrepancies in the hardware configuration between IOCDS and the storage controller, the host posts a system message to the console to let the system administrator know about problems in the hardware configuration.

Even though the host verifies the logical path and the device configuration, the host however, does not have a process to verify that the software device address ranges per LCU are configured properly in the IOCDS hardware definition.

The host uses software device addresses to access configured devices in a storage controller. A software device address is an arbitrary 16-bit number selected by the administrator setting up IOCDS. A software device address may be represented in hexadecimal form as four hexadecimal digits in the range 0x0000 to 0xFFFF. For a range of 256 software device addresses associated with the same LCU of a storage controller, the administrator might select for example, a software device address range starting at value 5000 and ending at 50FF.

Hardware Configuration Definition (HCD), the main tool used for the creation of IOCDS hardware definition does not detect invalid software device address ranges per LCU. When HCD is used to create IOCDS hardware configuration, HCD attempts to validate the software device address range and the LCU associated with the software device address range. However, HCD validation capability is limited. For example, in the following hardware configuration, HCD will reject the IOCDS hardware configuration because it detects two different software device address range mapped to the same LCU communicating to the same storage controller through the same CHPIDs and outbound port configuration. This concatenation of both CHPID and outboard port may be referred to as a "CHPID.Link." A single CHPID.Link may constitute a single logical path.

The following software address ranges may be defined and described by CHPID.Link nomenclature. Consider the following example. A Software Device Address range from E000 to E0FF may be configured to access devices in LCU 00 of a storage controller using CHPID and switch outbound port (destination link) combinations, such as CHPID.Link A0.40 A1.41 A2.42 A3.43. In addition, a Software Device Address range from F000 to F0FF may be configured to access devices in LCU 00 of the same storage controller using the same CHPID and outbound port combinations such as CHPID.Link A0.40 A1.41 A2.42 A3.43.

HCD invalidates the above IOCDS hardware configuration because both Software Device Address ranges use identical CHPID and Link combinations. If the IOCDS hardware configuration defined above had used two different CHPID.Link combinations per each software device address range, HCD would have validated the invalid hardware configuration. In such a case, HCD assumes that the two different CHPID.Link combinations are set up to access devices in two different storage controllers.

Consider another example, in which the applicable CHPID.Link combination is from A0.40 to A3.43, and from B0.60 to B3.63. In this case, the Software Device Address range from E000 to E0FF is assigned to access devices in LCU 00 of a storage controller using CHPID and switch outbound port combinations, such as, CHPID.Link A0.40 A1.41 A2.42 A3.43. In addition, a Software Device Address range from F000 to F0FF is assigned to access devices in LCU 00 of the same storage controller using different CHPid and switch outbound port combinations, such as, B0.60 B1.61 B2.62 B3.63.

In the above IOCDS hardware configuration, it may be seen that system administrator has defined four logical paths per LCU. Again, a single logical path is defined as one CHPid.Link combination. For example, the CHPID.Link combination A0.40 constitutes one logical path to access devices in LCU 00. Therefore, there a total of eight logical paths are defined from the host to the storage controller to access devices in LCU 00.

Although there is no constraint on the number of logical paths defined per LCU, an architectural limitation remains for the maximum number of logical paths per LCU that can be part of a path group. A host creates path groups per LCU when devices in the LCU are vary-on. The host groups all logical paths of an LCU into a single path group per each LCU configured. In one embodiment, the maximum number of logical paths per path group per LCU may be defined as eight. If the host sends a command to add a ninth logical path to a path group of the LCU, the storage controller will reject the command because the maximum number of logical paths per path group per LCU allowed is defined as eight. Once the host receives the rejected command, the host posts a system message to indicate to the system administrator that the maximum number of logical paths per path group per LCU has been exceeded.

In the above example, the combined number of logical paths is eight. Therefore, all eight logical paths are grouped into the same path group for LCU 00. As a result, the invalid IOCDS hardware configuration may go undetected for some time. Both software device address ranges may access the same device in LCU 00 of the same storage controller, which may lead to two different software applications unintentionally accessing the same I/O device. Typically, in such situations, the only way to detect the invalid IOCDS hardware configuration has been through visual inspection of the hardware definition provided to HCD.

The present description and claimed subject matter describe exemplary system, method, and computer program product embodiments for verifying input/output hardware configurations in computer environments for scenarios such as those described above. These embodiments include the use and execution of a verify command, for example, in the applicable operating system. The verify command may be configured to be the first command sent from the host to the controller (e.g., storage controller) after the host establishes a logical path. The host may be configured to send this new command for each logical path it establishes.

The verify command data will contain the IOCDS hardware configuration for the software device address range associated with the LCU. When the controller receives the command, the controller verifies the software device address range of the logical path against the software device address range of the other logical paths. For the command to be accepted without error, the software device address range must match the known software device address range associated with the other logical paths of the LCU. When the storage controller detects a mismatch, the storage controller will reject the command with sense data. The sense data will point out where the divergence is between the software address range of the logical path compared to the software address range of the other logical paths.

When the host receives the status response to the command, the host may then decide the kind of action it will take in case the controller had detected an inconsistency in the software device address range associated with the LCU and the logical path.

To build the command data, the host may use IOCDS hardware configuration. The host may extract from IOCDS hardware configuration the software device address range associated with an LCU that uses a logical path that will be established.

Once a host Establish Logical Path (ELP) command for the logical path is accepted, the host may send the command with the data it obtained from IOCDS hardware configuration. If the command is rejected, the host will display a system message to indicate the failure in the IOCDS hardware configuration. In addition, due to the nature of the problem, the host may decide to remove the logical path associated with the misconfigured IOCDS hardware configuration to maintain data integrity, for example.

A user may modify IOCDS after the logical path has been established and the verify command has been accepted. The user may, in fact, modify the IOCDS some time after applications have started to use the logical path and devices in the controller. In such a scenario, once the user has committed the updates to IOCDS, the host may remove the logical path. Then the host may re-establish the logical path, and send the command with its updated view of the storage configuration.

Figure 2:
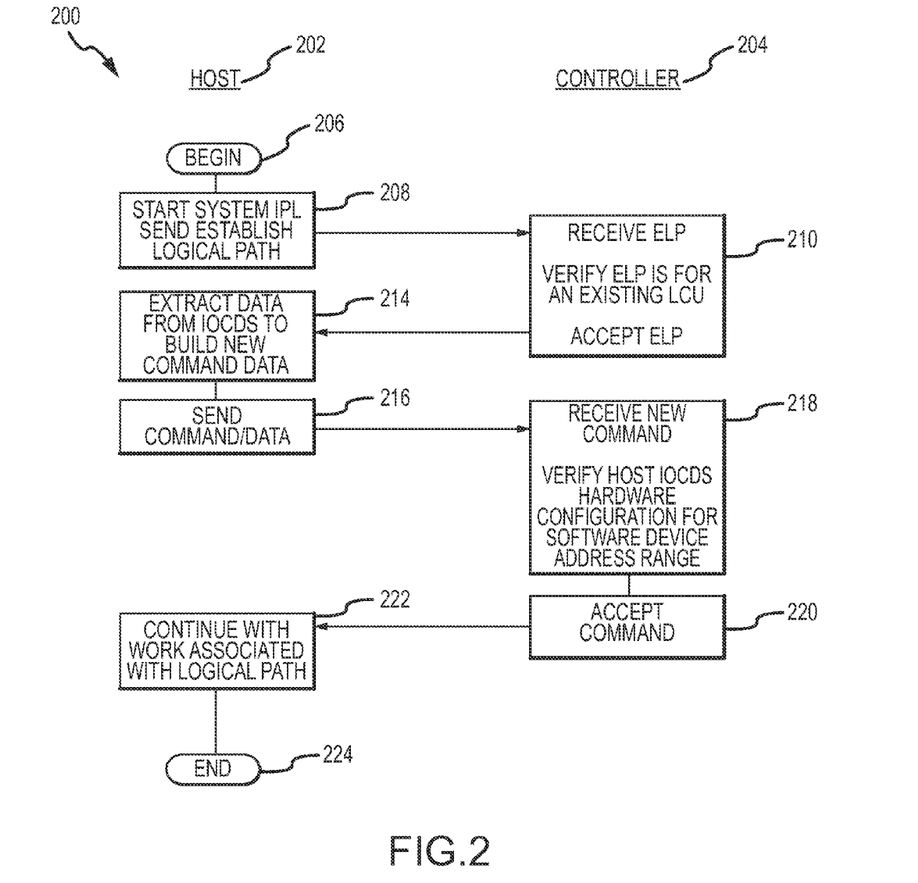
FIG. 2 is a flow chart diagram of a first exemplary method for verifying an input/output hardware configuration.

Turning to FIG. 2, a first exemplary method of verifying an I/O hardware configuration in light of the foregoing is depicted. Method 200 describes a valid logical path scenario. In each of the following exemplary methods such as method 200, it is assumed that IOCDS is utilized in combination with an applicable operating system. As such, the user/administrator first defines the IOCDS hardware configuration as a preliminary matter as previously described, and the IOCDS hardware configuration data is extracted and utilized as will be described. However, one skilled in the art will appreciate that the exemplary methods may be tailored for other specific applications involving other operating systems, hardware configuration processes, and the like. In addition, each of the following exemplary methods describes the activities of the host (denoted as reference number 202) and the controller (denoted as reference number 204).

Exemplary method 200 begins (step 206) with the host starting a system initial program load (IPL). The host then sends the Establish Logical Path (ELP) command to the controller (step 208). The controller then receives the ELP command and verifies the ELP for an existing LCU of the controller. If this is the case, the controller accepts the ELP (step 210).

The host then extracts data from the IOCDS hardware configuration to build command data for the verify command. The verify command is then sent (including the extracted IOCDS data) (Step 216). As previously described, the verify command may include a software device address range associated with a particular logical control unit (LCU) of the I/O hardware, the LCU utilizing a first logical path. The controller then receives the verify command. The controller processes the verify command, comparing the host IOCDS configuration for the software device address range with existing software device address range of the controller/LCU utilizing at least one additional logical path.

Since the scenario in method 200 assumes a valid logical path, the software address ranges are assumed to match, and the controller accepts the verify command, providing an indication back to the host (step 220). The host then continues with work (e.g., applications) associated with the validated logical path (step 222). The method 200 then ends (step 224).

Figure 3:
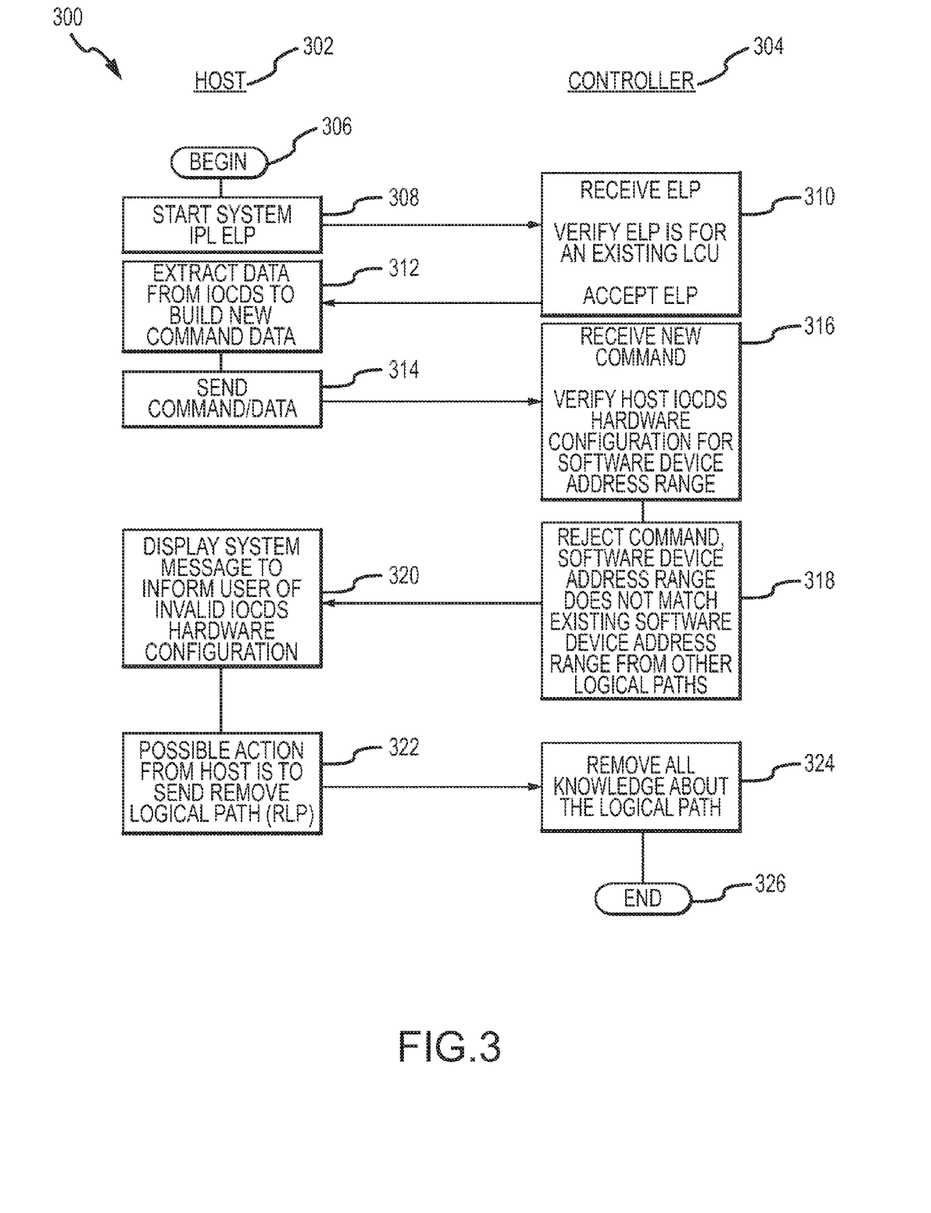
FIG. 3 is a flow chart diagram of a second exemplary method for verifying an input/output hardware configuration.

Turning to FIG. 3, a second exemplary method of verifying an I/O hardware configuration is depicted. Method 300 assumes that the I/O hardware configuration is invalid (e.g., an invalid logical path). Again, the respective activities of host 302 and controller 304 are shown. Method 300 begins (step 306) in a fashion similar to method 200, where the host starts a system IPL and sends the ELP command (step 308), and the controller receives and verifies the ELP is for an existing LCU, upon which the ELP is accepted (step 310).

Here again, the host extracts data from IOCDS to build new verify command data (step 312) which is then sent to the controller (step 314). The controller receives the command and compares the IOCDS hardware configuration's software address range with an existing software address range of the controller (step 316). Since the address ranges are assumed to not match, the controller rejects the command (step 318), communicating such an indication to the host.

As a next step, the host may display a system message to inform the user/administrator of an invalid IOCDS hardware configuration (step 320). One possible result may be for the host to send a Remove Logical Path (RLP) command to the controller (step 322). The controller then receives the RLP command and removes all knowledge about the invalid logical path (step 324). Method 300 then ends (step 326).

Figure 4:
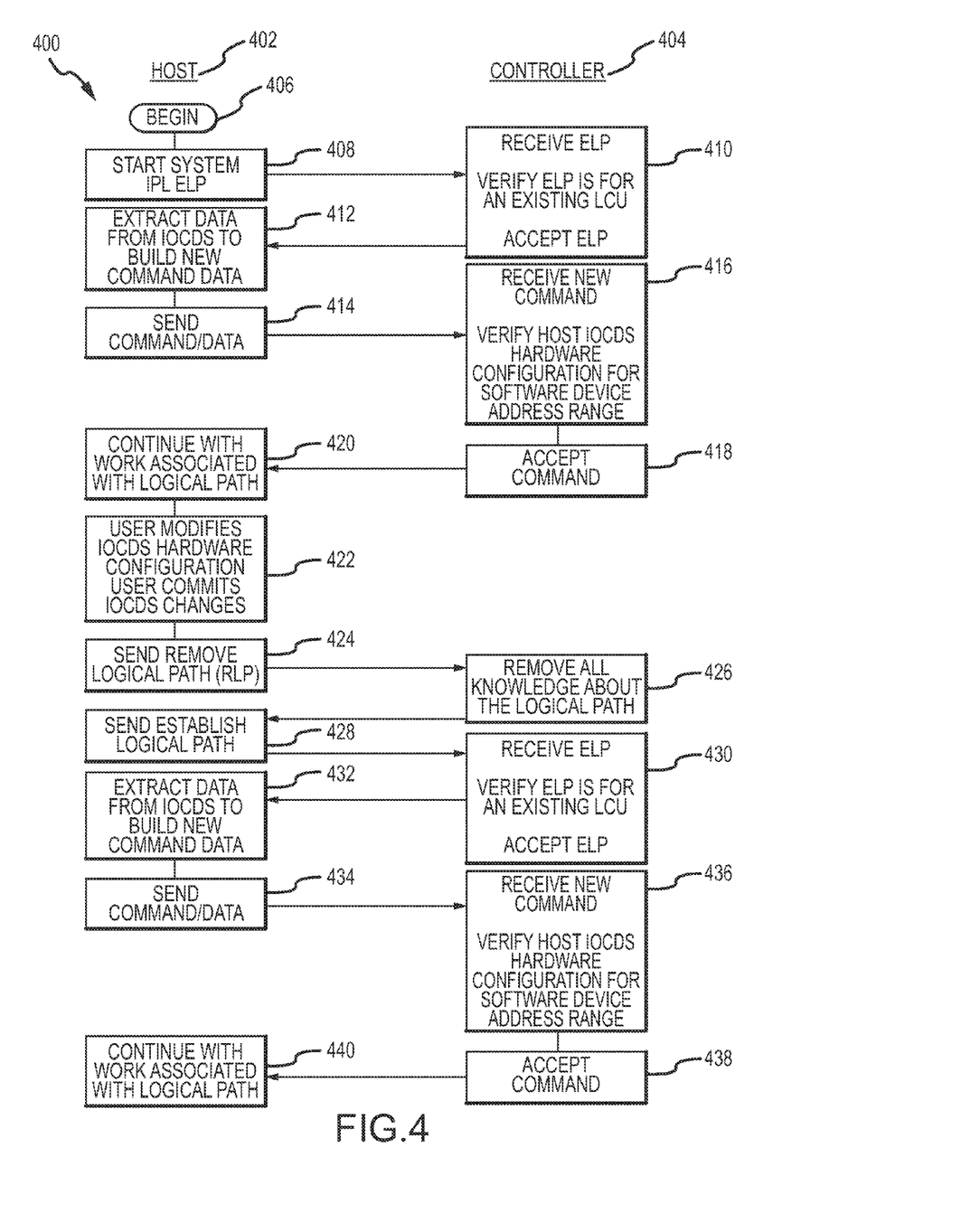
FIG. 4 is a flow chart diagram of a third exemplary method for verifying an input/output hardware configuration.

Turning to FIG. 4, a third exemplary method of verifying an I/O configuration is depicted. Method 400 depicts the scenario previously described where a user modifies the IOCDS hardware configuration once an initial verification has taken place. Here again, host activities 402 and controller activities 404 are shown. Steps 406, 408, 410, 412, 414, 416, 418 and 420 proceed in a similar fashion to method 200, where the controller initially validates the IOCDS hardware configuration for a particular software address range. The host continues to perform work associated with the validated logical path until the user modifies the IOCDS hardware configuration and commits the changes (step 422).

As a next step in method 400, the host sends an RLP command (step 424), and the controller executes the command to remove all knowledge about the logical path (step 426). The host then sends an additional ELP command (step 428), which is received by the controller, verified for an existing LCU and accepted (step 430). The host then extracts data from the modified IOCDS (step 432) to build a new verify command.

The host then sends the new verify command (again including the modified IOCDS data) to the controller (step 434). The command is received and again, a similar verification step to those previously (matching applicable software address ranges) occurs (step 436). Assuming the configuration is validated, the command is again accepted (step 438). The host then continues to perform work associated with the validated logical path (step 440). The method 400 then ends (step 442).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for verifying an input/output (I/O) hardware configuration, comprising:
   starting an initial program load (IPL) and sending an establish logical path (ELP) command;
   verifying the ELP is for a logical control unit (LCU);
   extracting data from an input/output configuration data set (IOCDS) for building a verification command, the IOCDS containing a plurality of hardware requirements that define at least a plurality of software devices associated with the LCU, a collection of characteristics for each of the plurality of software devices, and an indication as to whether one of the plurality of software devices is one of off-line and online at the IPL;
   processing the verification command including a software device address range associated with the LCU of the I/O hardware configuration, the LCU utilizing a first logical path; and
   comparing the software device address range utilizing the first logical path to the LCU with an existing software device address range utilizing at least one additional logical path to the LCU and verifying the first logical path is established for the LCU.

2. The method of claim 1, further including performing one of:
   accepting the verification command if the software device address range and the existing software device address range match, and
   rejecting the verification command if the software device address range and the existing software device address range do not match.

3. The method of claim 2, wherein rejecting the verification command includes sending a system message indicating a misconfiguration of the I/O hardware configuration.

4. The method of claim 3, wherein rejecting the verification command further includes executing a remove logical path (RLP) command to remove the first logical path from system memory.

5. The method of claim 4, wherein the RLP command is executed upon a user modification of the I/O hardware configuration.

6. The method of claim 1, further including receiving the first logical path.

7. A system for verifying an input/output (I/O) hardware configuration, comprising:
   a processor device,
   a controller connected to the processor device and coupled to a logical control unit (LCU) of the I/O hardware configuration, the controller configured to:
      start an initial program load (IPL) and sending an establish logical path (ELP) command,
      verify the ELP is for a logical control unit (LCU);
      receive a verification command that includes at least extracted data from an input/output configuration data set (IOCDS) of the I/O hardware configuration for building the verification command, the IOCDS containing a plurality of hardware requirements that define at least a plurality of software devices associated with the LCU, a collection of characteristics for each of the plurality of software devices, and an indication as to whether one of the plurality of software devices is one of off-line and online at the IPL,
      process the verification command including a software device address range associated with the LCU, the LCU utilizing a first logical path, and
      compare the software device address range utilizing the first logical path to the LCU with an existing software device address range utilizing at least one additional logical path to the LCU and verify the first logical path is established for the LCU.

8. The system of claim 7, wherein the controller is further configured to perform at least one of:
   accepting the verification command if the software device address range and the existing software device address range match, and
   rejecting the verification command if the software device address range and the existing software device address range do not match.

9. The system of claim 8, wherein the controller is further configured to, pursuant to rejecting the verification command, send a system message indicating a misconfiguration of the I/O hardware configuration.

10. The system of claim 8, wherein the controller is further configured to, pursuant to rejecting the verification command, execute a remove logical path (RLP) command to remove the first logical path from system memory.

11. The system of claim 10, wherein the controller is further configured to execute the RLP command upon a user modification of the I/O hardware configuration.

12. The system of claim 7, wherein the controller is further configured to receive the first logical path.

13. A computer program product for verifying an input/output (I/O) hardware configuration, the computer program product comprising a non-transitory computer-readable storage medium having computer-readable program code portions stored therein, the computer-readable program code portions comprising:
   a first executable portion for starting an initial program load (IPL) and sending an establish logical path (ELP) command;
   a second executable portion for verifying the ELP is for a logical control unit (LCU);
   a third executable portion for extracting data from an input/output configuration data set (IOCDS) for building a verification command, the IOCDS containing a plurality of hardware requirements that define at least a plurality of software devices associated with the LCU, a collection of characteristics for each of the plurality of software devices, and an indication as to whether one of the plurality of software devices is one of off-line and online at the IPL;
   a fourth executable portion for processing the verification command including a software device address range associated with the LCU of the I/O hardware configuration, the LCU utilizing a first logical path; and
   a fifth executable portion for comparing the software device address range utilizing the first logical path to the LCU with an existing software device address range utilizing at least one additional logical path to the LCU and for verifying the first logical path is established for the LCU.

14. The computer program product of claim 13, further including a sixth executable portion for performing at least one of:
   accepting the verification command if the software device address range and the existing software device address range match, and
   rejecting the verification command if the software device address range and the existing software device address range do not match.

15. The computer program product of claim 14, further including a seventh executable portion for sending a system message indicating a misconfiguration of the I/O hardware configuration pursuant to rejecting the verification command.

16. The computer program product of claim 14, further including a seventh executable portion for executing a remove logical path (RLP) command to remove the first logical path from system memory.

17. The computer program product of claim 16, further including an eighth executable portion for executing the RLP command upon a user modification of the I/O hardware configuration.

18. The computer program product of claim 13, further including a sixth executable portion for receiving the first logical path.

* * * * *